United States Patent Office 3,346,615
Patented Oct. 10, 1967

3,346,615
MANUFACTURE OF ESTERS
Janice L. Greene, Warrensville Heights, Ohio, assignor to The Standard Oil Company, Cleveland, Ohio, a corporation of Ohio
No Drawing. Filed Aug. 10, 1964, Ser. No. 388,699
5 Claims. (Cl. 260—464)

The present invention relates to the production of esters of 1,2-cyclobutanedicarboxylic acids and more particularly pertains to the process for producing alkyl esters of either cis- or trans-1,2-cyclobutanedicarboxylic acids or mixtures thereof from the corresponding cis- or trans-1,2-dicyanocyclobutane via the acid adduct.

The process of this invention involves the reaction of the acid monohydrate adduct of a 1,2-dicyanocyclobutane with an aliphatic or alicyclic alcohol, and olefin or an olefin adduct.

The 1,2-dicyanocyclobutanes useful in the present invention are those having the formula

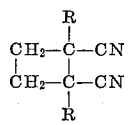

wherein the R groups may be the same or different and R represents hydrogen, a lower alkyl group and a halogen. Preferred are 1,2-dicyanocyclobutanes of the foregoing structure wherein R represents hydrogen or a methyl group. The di-acid monohydrate of 1,2-dicyanocyclobutane is prepared from 1 mole of the 1,2-dicyanocyclobutane and two moles of acid monohydrate such as sulfuric acid or phosphoric acid. The disulfuric acid monohydrate adduct of 1,2-dicyanocyclobutane is conveniently produced by the procedure more fully described in U.S. Patent No. 3,202,695. The di-acid monohydrate adduct of 1,2-dicyanocyclobutane has the formula

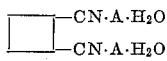

wherein A represents $HSO_4^-$ or $H_2PO_4^-$.

Thus, the present process embodies the production of diesters from aliphatic or alicyclic mono- or polyhydric alcohols, olefins or olefin adducts containing from 1 to 20 carbon atoms as depicted in the following equation wherein a monohydric alcohol R'OH is employed:

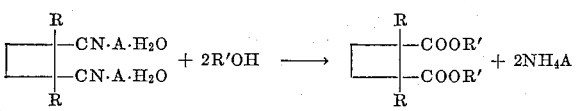

wherein R and A have the foregoing designations and R' represents a primary or secondary hydrocarbon group having from 1 to 20 carbon atoms.

It should be pointed out that the exact structure of the 1,2-dicyanocyclobutane sulfuric acid monohydrate adduct is not known with certainty although it probably is one or more of the following structures:

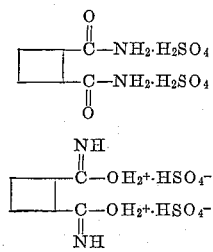

or

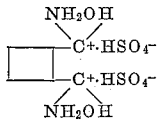

For convenience the sulfuric acid monohydrate adduct of the 1,2-dicyanocyclobutanes useful in this invention are considered to have the following structure:

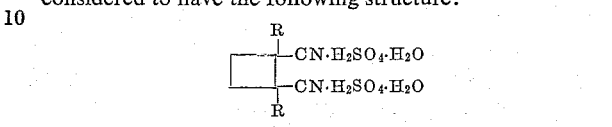

wherein R has the foregoing designation.

Similarly, the structure of phosphoric acid monohydrate adduct is probably one or more of the following:

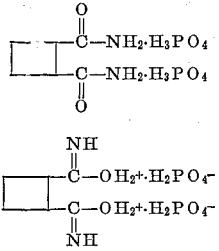

or

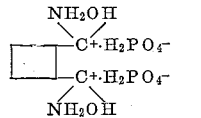

For convenience the phosphoric acid monohydrate adduct of the 1,2-dicyanocyclobutane useful in this invention are considered to have the following structure:

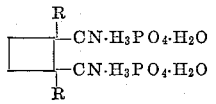

wherein R has the foregoing designation.

The preparation of trans-dimethylcyclobutane-1,2-dicarboxylate is disclosed in J. Gen. Chem. (U.S.S.R.), 13, 373–81 (1943). This ester was prepared by reacting trans-cyclobutane-1,2-dicarboxylic acid with methyl alcohol in the presence of dry hydrogen chloride or concentrated sulfuric acid at room temperature.

In making the intermediate sulfuric acid monohydrate or phosphoric acid monohydrate adduct of 1,2-dicyanocyclobutane, sulfuric acid monohydrate or phosphoric acid monohydrate and 1,2-dicyanocyclobutane are mixed together at a temperature of from 40° C. to 125° C. for from 15 minutes to 4 hours followed by cooling. The reaction is exothermic and external cooling may be used if desired. Reaction temperatures of from 50° to 95° C. are preferred because higher temperatures may somewhat affect the stability of the cyclobutane ring. The preferred reaction time in the preparation of the intermediate adduct is from about 1 to 2 hours.

The adduct is then converted to the corresponding ester of the dicarboxylic acid preferably with an excess amount of alcohol. Up to about 300% excess alcohol may be employed, inasmuch as the alcohol also serves as a solvent and the excess may be recovered and recycled back for use in subsequent reaction mixtures. The reaction between the adduct and the alcohol is allowed to proceed for a period of from about 2 to 24 hours at from about room temperature up to about 200° C. It is preferred that a temperature of at least about 45° C. be employed.

At the conclusion of the reaction the mixture is cooled and the diester product can be isolated in one of several ways. For instance, the reaction mixture may be poured into water and extracted with ether. The ether extract is then washed with an aqueous solution of mildly alkaline material such as sodium bicarbonate to remove traces of acid, followed by rewashing with water, drying, and evaporating. The diester is then isolated by fractional distillation from the residue. Alternately, the cooled reaction mixture may be simply filtered and the filtrate vacuum distilled to give the ester. Other methods of isolation of the diester product may be used. If the ester is a solid, it may be extracted with a suitable organic solvent, such as ether, dioxane, etc., followed by evaporation and recrystallization.

In the following examples which will further illustrate this invention, the amounts of ingredients are expressed as parts by weight unless otherwise indicated.

Example I

Dimethyl trans-1,2-cyclobutane-1,2-dicarboxylate was prepared as follows: Trans-1,2-dicyanocyclobutane (112 grams, 1.055 moles) was added slowly with stirring to 275 grams (2.37 moles) of sulfuric acid monohydrate, followed by the addition of 200 grams (6.25 moles) of methanol. The reaction mixture was maintained between 65–69° C. throughout both exothermic reactions. After refluxing for 17 hours, the mixture was poured into water and extracted with ether. The ether extracts were washed with aqueous NaHCO$_3$ solution followed by water and then dried with anhydrous CaSO$_4$ and evaporated. Fractional distillation of the residue gave 174 grams (96% yield; 100% conversion) of dimethyl transcyclobutane-1,2-dicarboxylate, B.P. 75° C./2.25 mm.

Example II

Dimethyl cis-1,2-cyclobutanedicarboxylate was prepared as follows: In a 300 ml., 3-necked flask fitted with a dropping funnel, stirrer and thermometer were placed 81.6 g. of sulfuric acid (96.4%, 0.8 mole) and 14.8 grams of water (0.804 mole). When the acid hydrate had cooled to about 70° C., 42.4 grams (0.4 mole) of cis-1,2-dicyanocyclobutane was slowly added from the dropping funnel. The mixture was heated with infrared lamps to keep the temperature between 70° C. and 110° C. during the two hour addition period. After the addition of the dicyanocyclobutane was completed, the adduct was stirred for 15 minutes and then 100 ml. of methanol (12.5 moles) were added from a dropping funnel to which was attached a reflux condenser and a temperature of about 70° C. was maintained. The brown one-phase solution was refluxed for 16 hours and then was poured into 100 ml. of water. The organic layer was separated and the water layer was extracted with four 50 ml. portions of ether. The ether extract and organic layer were combined, washed with aqueous sodium bicarbonate solution and with water. After stripping off the ether, the crude ester (53 g.) was dried with CaSO$_4$ and distilled, yielding 44 g. dimethyl cis-1,2-cyclobutanedicarboxylate. This corresponded to a 63.2% yield of the ester.

Example III

Di-2-ethylhexyl trans-1,2-cyclobutanedicarboxylate was prepared as follows: The sulfuric acid monohydrate adduct from trans-1,2-dicyanocyclobutane (106 g.; 0.314 mole) and 2-ethylhexanol (163 g.; 1.25 moles) were combined and refluxed overnight. When cool, the organic material was filtered from the solid ammonium bisulfate and vacuum-distilled to give 60 g. (52% yield) of di-2-ethylhexyl trans-1,2-cyclobutanedicarboxylate, B.P. 183–185° C. at 2 mm. pressure. This compound was identified by its infrared and nuclear magnetic resonance spectra.

Example IV

Di-isoamyl trans-1,2-cyclobutanedicarboxylate was prepared as follows: The sulfuric acid monohydrate adduct from trans-1,2-dicyanocyclobutane (120 g.; 0.355 mole) and isoamyl alcohol (126 g.; 1.43 moles) were combined and refluxed overnight. When cool, the organic material was filtered from the solid ammonium bisulfate and vacuum distilled to give 80 g. (80% yield) of di-isoamyl trans-1,2-cyclobutanedicarboxylate, B.P. 133° C./1.0 mm. This ester was identified by its infrared and NMR spectra.

Example V (A) Several esters of 1,2-cyclobutanedicarboxylic acid were prepared by the following general procedure and the results are given in Table 1: The sulfuric acid monohydrate adduct of trans-1,2-dicyanocyclobutane was mixed with the specified alcohol and the resulting mixture was refluxed for the time shown in Table 1. At the end of the reflux period the mixture was cooled, whereupon the crystalline ammonium bisulfate separated and was removed by filtration. The filtrate was then fractionally distilled under reduced pressure and the distillate was analyzed by infrared, NMR and vapor chromatography.

(B) When secondary alcohols such as isopropanol and cyclohexanol were employed in the ester preparations described in A above, it was found that incorporation of one mole of water in the alcohol feed resulted in a substantial increase in the production of ester, provided the reaction temperature was maintained above 150° C. It was necessary to add a high boiling inert reaction medium in the isopropanol reaction in order to maintain a reaction temperature greater than 150° C.

TABLE 1

| Alcohol | Reflux Time, hours | Temp., ° C. | Percent Yield |
|---|---|---|---|
| Methyl | 17 | 90 | a 96 |
| Methyl* | 17 | 90 | b 63 |
| Iso-propyl | 75 | 105 | 74 |
| Iso-propyl d e | 82 | 155 | 84 |
| Allyl | 3 | 100 | 82 |
| Iso-amyl | 20 | 130 | c 80 |
| Cyclohexyl d | 17 | 160 | a 91 |
| 2-ethylhexyl | 17 | (about) 180 | c 89 |
| n-Octyl | 20 | (about) 200 | c 97 |
| Sec-octyl | 17 | (about) 180 | 87 |
| Iso-octyl | 17 | (about) 180 | 93 |
| Iso-decyl | 17 | 160 | 81 |
| n-Decyl | 13 | 85 | 90 |

*Cis-1,2-dicyanocyclobutane adduct used.
a Ester was 100% trans as determined infrared and NMR.
b Ester was 100% cis.
c Ester was about 75% trans and 25% cis.
d Alcohol feed included one mole of water per mole of adduct.
e Mesitylene and dodecane were added to increase reflux temperature.

Example VI

An adduct of one mole of 1,2-dicyanocyclobutane and two moles of phosphoric acid monhydrate was prepared as follows: Molten 1,2-dicyanocyclobutane was added dropwise to two moles of 85% phosphoric acid contained in a flask equipped with a stirrer, dropping funnel, thermometer and reflux condenser. The resulting mixture was then heated to 130° C. or to 230° C. to insure product formation. After cooling to about 60° C., 3 moles of methanol were added and the reaction mixture was refluxed overnight. After cooling the mixture to room temperature it was poured into water, extracted with ether and the organic layer was dried, stripped and distilled under reduced pressure. Infrared analysis of the distillate revealed yields and conversions to the dimethyl trans-1,2-cyclobutanedicarboxylate (see Table 2).

TABLE 2

| Adduct Reaction Temperature, ° C. | Reflux Temp., ° C. | Reflux Time, hours | Percent Yield Ester |
|---|---|---|---|
| 132 | 68 | 17 | 82 |
| 230 | 68 | 17 | 63 |

Results similar to those given above were also obtained when 1,2-dicyano-1,2-dimethyl cyclobutane from the cyclic dimerization of methacrylonitrile was used as starting material in place of 1,2-dicyanocyclobutane.

I claim:
1. The process for preparing esters having the formula

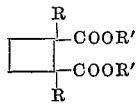

wherein R is hydrogen or a lower alkyl group and R' represents an alkyl group having from 1 to 20 carbon atoms comprising reacting
   (A) the adduct resulting from mixing together one mole of 1,2-dicyanocyclobutane and two moles of the monohydrate of an acid selected from the group consisting of sulfuric acid and phosphoric acid at a temperature of from 40° C. to 125° C. for from 15 minutes to 4 hours with
   (B) an alcohol having the formula R'OH wherein R' has the foregoing designation
at a temperature of from about room temperature up to about 200° C.

2. The process of claim 1 wherein R is hydrogen and the acid is sulfuric acid.

3. The process of claim 2 wherein the reaction temperature for the reaction of (A) plus (B) is from about 45° C. to 200° C.

4. The composition resulting from the reaction between one mole of a 1,2-dicyanocyclobutane and two moles of the monohydrate of phosphoric acid at a temperature of from 40° C. to 125° C. for from 15 minutes to 4 hours, said composition having the formula

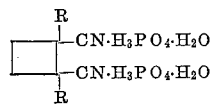

wherein R is hydrogen or a lower alkyl group.

5. The composition of claim 4 wherein R is hydrogen.

References Cited

UNITED STATES PATENTS 3,110,729  11/1963  Greene et al. _____ 260—464 X
3,202,695  8/1965  Greene et al. _____ 260—464

JOSEPH P. BRUST, *Primary Examiner.*

CHARLES B. PARKER, *Examiner.*